May 18, 1943.  J. W. BROOKS  2,319,718
AIR COMPRESSOR
Filed Sept. 6, 1940  2 Sheets-Sheet 1
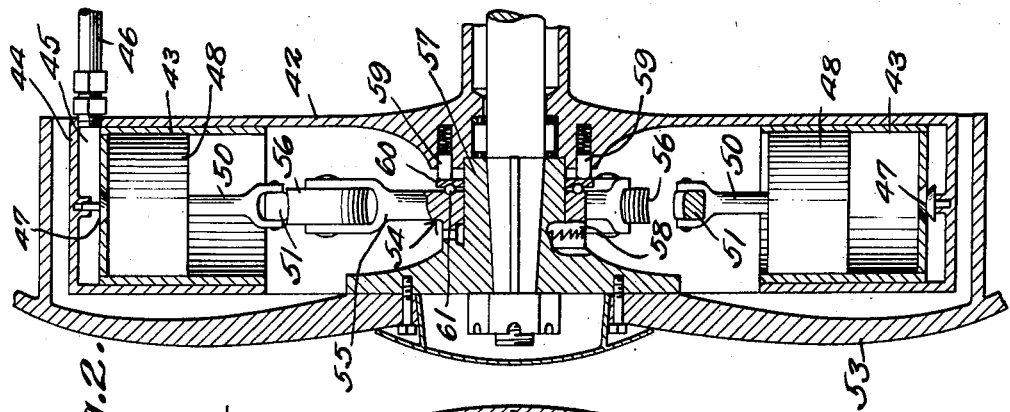
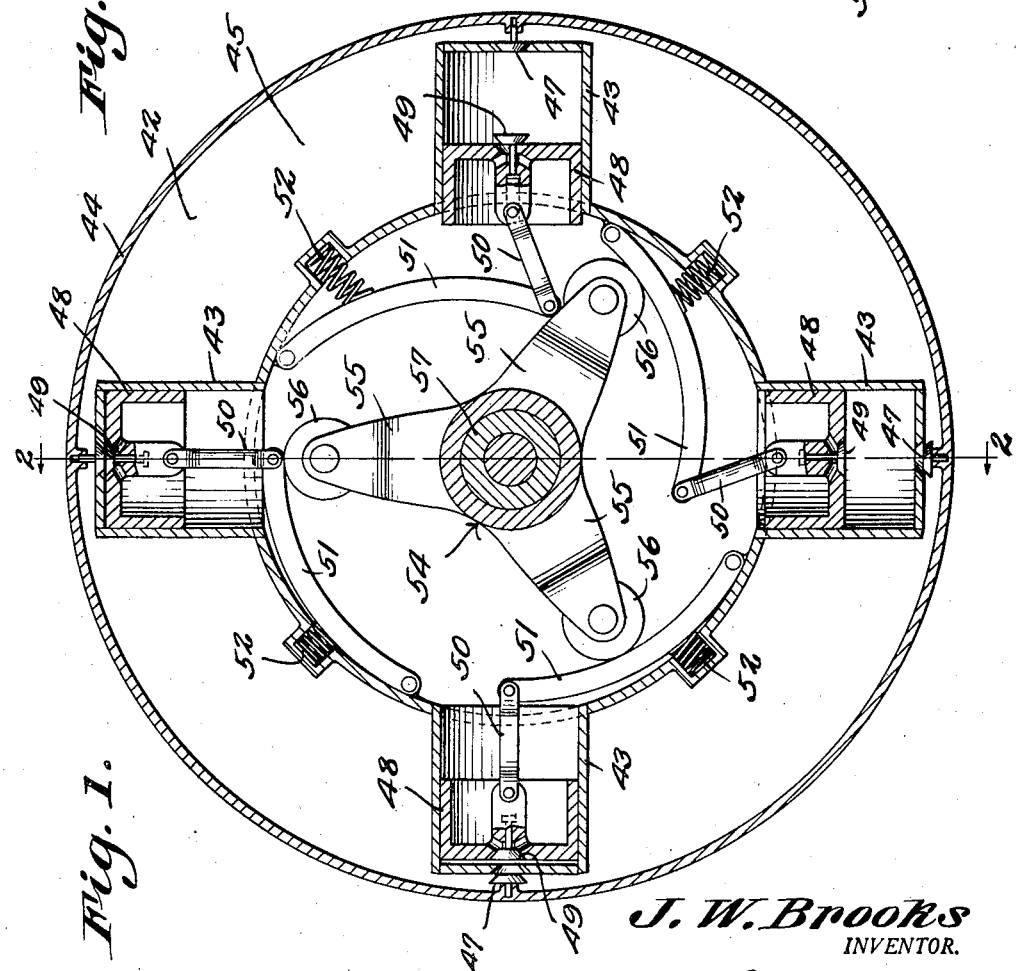
J. W. Brooks
INVENTOR.
BY *[signature]*
ATTORNEYS.

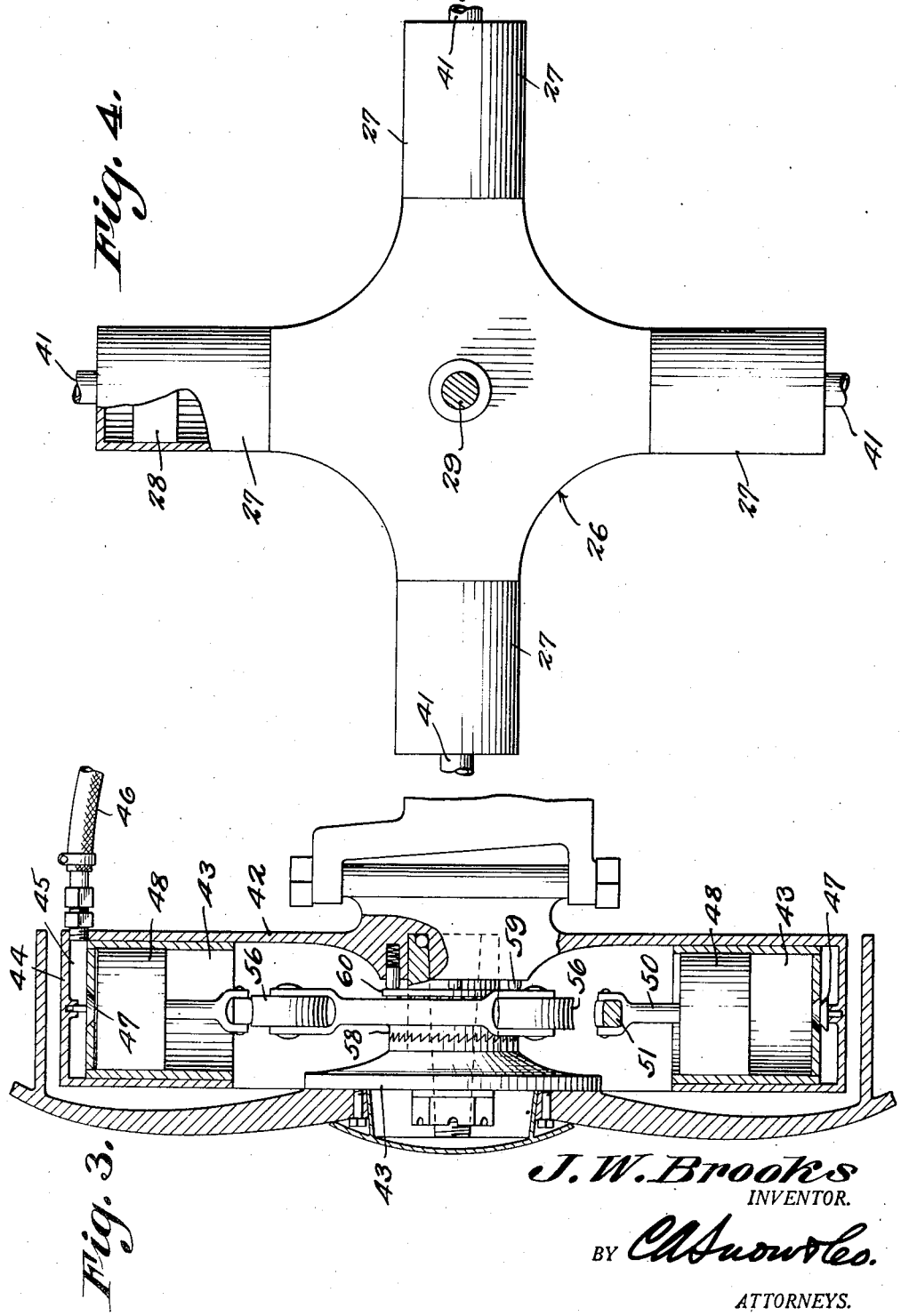

Patented May 18, 1943

2,319,718

UNITED STATES PATENT OFFICE 2,319,718

AIR COMPRESSOR

John W. Brooks, Petersburg, Va.

Application September 6, 1940, Serial No. 355,671

1 Claim. (Cl. 230—194)

This invention relates to air compressors, and particularly to that type of air compressor used in conjunction with motor vehicles.

An important object of the invention is to provide an air compressor operated by the rotation of the wheels of the motor vehicle, on which the compressor is mounted.

Another object of the invention is to provide a compressor which is built into a motor vehicle wheel, to the end that complicated gearing and mechanical parts, are reduced to a minimum.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawings

Figure 1 is a longitudinal sectional view through an air compressor constructed in accordance with the invention.

Figure 2 is a sectional view through one of the wheels of a motor vehicle, illustrating the compressor as mounted therein, taken on line 2—2 of Figure 1.

Figure 3 is a sectional view through one of the front wheels of a vehicle, equipped with the compressor.

Figure 4 is an elevational view of the auxiliary compressor used in conjunction with the compressors of the wheels.

Referring to the drawings in detail, the reference character 26 designates an air compressor, which comprises a plurality of cylinders 27, in which the pistons 28 operate, the pistons being operated by means of a suitable belt and power device not shown.

Pipes 41 are connected with the cylinders 27, and provide means whereby air compressed in the cylinders, may be stored in a suitable tank not shown.

When the compressor is used on a motor vehicle, in addition to the air compressor 26, compressors are built into the wheels of the vehicle. The compressors of the rear wheels of a vehicle are shown by Figs. 1 and 2 of the drawings while the compressors of the front wheels are shown by Fig. 3 of the drawings. Each of the compressors used in the rear wheels of a vehicle, includes a stationary section 42 in which the cylinders 43 are mounted, the cylinders 43 having their outer ends spaced from the outer wall 44 of the stationary section, providing an air passageway 45. A pipe indicated at 46 establishes communication with a compression tank not shown, so that air compressed in the cylinders 43 may be directed to the tank. A valve indicated at 47 is mounted in the outer end of each cylinder 43 and controls the passage of compressed air from the cylinders to the air passageway 45.

The pistons operating in the cylinders 43 are indicated by the reference character 48, and each of these pistons is also provided with a valve 49, which valves seat on the pressure strokes of the pistons, and open on the reverse strokes of the pistons.

Connected with each piston is a link 50, the link 50 being connected with pivoted arms 51 that are slightly curved, and mounted within the stationary sections of the wheels. Springs 52 bear against the arms 51 and normally urge the arms inwardly to move the pistons inwardly.

The rotary sections of the wheels are indicated by the reference character 53, and these sections carry the rotors 54, each rotor embodying a plurality of arms 55 carrying wheels 56 at their outer ends, the wheels 56 moving over the inner surfaces of the arms 51, moving the arms and pistons connected therewith, to the outer ends of their cylinders. It will be seen by Figure 1 of the drawings, that there are three arms 55, while there are four cylinders and pistons, to the end that one piston is always in a position at the inner end of its cylinder, while the remaining pistons are moving towards the outer ends thereof, compressing air The rotors are mounted on the hubs 57 of the rotary sections of the wheels, and are locked to the rotary sections by the teeth 58, formed on the contacting surfaces of the rotor and rotary section 53. Spring-pressed pins 59 are supported in the stationary section of each wheel, and bear against a disk 60 that is formed with grooves to receive the ball bearings 61, whereby the teeth of the rotors are held into engagement with the teeth of the rotor sections of the wheels. It will be seen that by pressing the rotors against the spring pins, the initial positions of the rotors with respect to the pistons, may be changed or timed.

While I have shown and described the compressor as designed for use in a motor vehicle wheel, it is to be understood that the compressor may be driven by any suitable motor not shown.

What is claimed is:

In a device of the class described, a compressor embodying a casing, a plurality of cylinders arranged in a circular line within the casing, exhaust valves in the outer ends of the cylinders establishing communication between said cylinders and casing, valved pistons operating within the cylinders, curved pivoted arm mounted within the casing, yieldable means adapted to normally urge the arms inwardly, links connecting the arms with the pistons, and a rotary member within the casing and adapted to move over the curved pivoted arms, successively moving the pistons within their cylinders, compressing air in the casing, and an exhaust pipe through which air passes from the casing.

JOHN W. BROOKS.